United States Patent [19]
Di Laura

[11] 3,809,348
[45] May 7, 1974

[54] EXTERNAL WASTE PIPE SUPPORT STAND FOR TRAILERS

[76] Inventor: Ercole Thomas Di Laura, 105 Boone Trl., Severna Park, Md. 21146

[22] Filed: Mar. 14, 1972

[21] Appl. No.: 234,514

[52] U.S. Cl.................... 248/49, 248/87, 248/156
[51] Int. Cl............................................. F16l 3/04
[58] Field of Search.......... 248/49, 76, 87, 156, 150, 248/74 B, 75, 55

[56] References Cited
UNITED STATES PATENTS

| | | | |
|---|---|---|---|
| 2,472,654 | 6/1949 | Engelke | 248/49 |
| 3,554,474 | 1/1971 | Davies | 248/49 |
| 2,521,474 | 9/1950 | Morgan | 248/49 X |
| 675,106 | 5/1901 | Oberle | 248/49 |
| 2,993,671 | 7/1961 | Knebusch | 248/87 |
| 2,645,440 | 7/1953 | Heistand | 248/156 X |
| 3,572,622 | 3/1971 | Smith | 248/49 |
| 1,999,925 | 4/1935 | Buzhardt | 248/156 |
| 3,612,454 | 10/1971 | Linn | 248/156 X |
| 596,689 | 1/1898 | Aungst | 248/75 |
| 1,079,758 | 11/1913 | Gray | 248/55 |

FOREIGN PATENTS OR APPLICATIONS

| | | | |
|---|---|---|---|
| 81,467 | 5/1956 | Netherlands | 248/49 |
| 589,618 | 12/1959 | Canada | 248/74 B |

*Primary Examiner*—Roy D. Frazier
*Assistant Examiner*—Rodney H. Bonck
*Attorney, Agent, or Firm*—Walter G. Finch

[57] ABSTRACT

A new and improved support stand is provided to support and properly direct an external waste pipe from a mobile home, such as a portable or travel trailer, into the input of a sewer main. If required, two or more support stands can be used. Each support stand is constructed of telescoping tubular shafts. These shafts are adjustable in height and have tiltable troughs, with adjustable length extension bars connecting the troughs. These troughs, in turn, support the external waste pipe from a travel or portable trailer or the like. The stands are held in an upright position by flat blocks resting upon the ground and are secured thereto by stakes. The support stand can readily be used with camping trailers, campers, travel trailers, and mobile trailers of all types.

3 Claims, 3 Drawing Figures

PATENTED MAY 7 1974
3,809,348
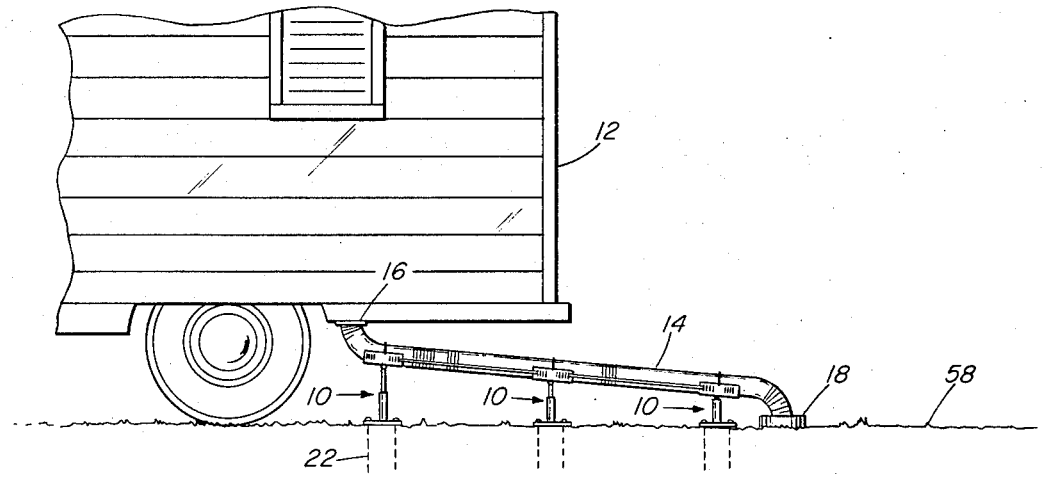
FIG. 1
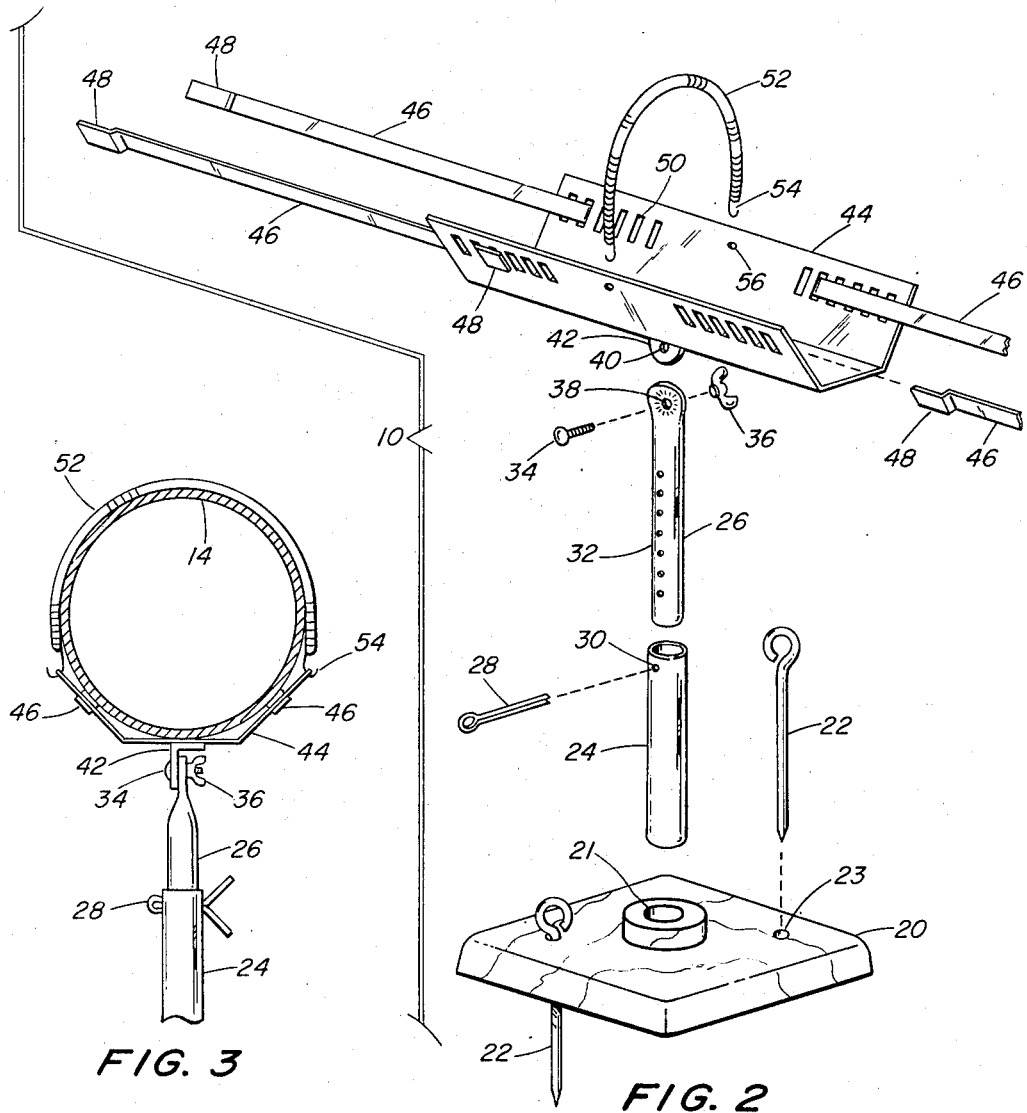
FIG. 3
FIG. 2

EXTERNAL WASTE PIPE SUPPORT STAND FOR TRAILERS

This invention relates generally to supporting stands, and more particularly it pertains to support stands specifically designed to support waste discharge pipes from a mobile or portable trailer.

There are many uses for this type of support stand as, for example, on mobile homes there is a flexible, external waste pipe connected to the underside of the vehicle. This waste pipe is then run along the usually uneven ground into a sewer main input. Frequently the waste material is not completely discharged from the waste pipe.

It is an object of this invention, therefore, to provide one or a plurality of support stands so designed to support and properly direct the external waste pipe from a mobile home into the input of a sewer main.

A further object of this invention is to provide pipe support stands that are adjustable in height.

A still further object of this invention is to provide pipe support stands that are tiltable to insure a proper angle for drainage thereof of waste that is to be disposed.

Also, it is an object of this invention to provide pipe support stands that are light weight, easy to install, and collapsible for storage.

Other objects and attendant advantages of this invention will become more readily apparent and understood from the following detailed specification and accompanying drawings in which:

FIG. 1 is a side elevation view of the rear end of a mobile home, such as a portable trailer, a waste outlet pipe being supported by the support stand, incorporating features of this invention;

FIG. 2 is a perspective exploded view of the complete support stand assembly; and FIG. 3 is a partial end view of the support stand assembly with a disposal pipe in place.

Referring now to FIG. 1 of the drawings, there is shown a typical installation of a plurality of support stands 10 incorporating features of this invention. A waste pipe 14 is shown connected at 16 to a mobile home such as travel or portable trailers 12. This waste pipe 14 is supported by a series of spaced support stands 10 and is being directed, at the proper angle, for complete discharge of waste material, to the sewer main input 18. The stands from the trailer 12 are secured to the ground 58 by stakes 22.

FIG. 2 shows an exploded perspective view of a complete stand assembly 10. This stand assembly 10 is comprised of a trough 44 having a plurality of spaced slots 50.

This trough 44 is attached onto the top of a two piece metal telescoping shaft 24 and 26 by a bracket 42. It is secured by a bolt 34 and a wing nut 36 through holes 38 and 40.

The height of the stand 10 is controlled by a series of holes 32 in the top shaft 26 mating with a hole 30 in the bottom shaft 24, secured by a cotter pin 28. The lower end of shaft 24 is inserted into a retaining hole 21 in a wooden base 20, thus holding the trough 44 in an upright position.

The base 20 is secured to the ground by means of metal spikes 22, driven through the holes 23 in the base 20.

When more than one stand 20 is used, as is generally the case, the troughs 44 are connected together by means of the formed ends 48 of the extension bars 46 engaging the slots 50.

The distance between the troughs 44 can be adjusted by the selection of the slots 50. A retaining tension spring 52 is placed over the pipe 14, as shown in FIG. 3, and it is secured by the hooks 54 of the spring 52 engaging into the holes 56 of the trough 44.

The configuration of the troughs 44 and the extension bars 46 permits the unencumbered movement of the pipes 14. In addition, the resiliency of the retaining springs 52 precludes lateral movement of the pipes 14 from the troughs 44 but permits longitudinal movement therein.

It is to be noted that if the terrain is uneven, rough, or sloping, that each stand assembly 10 can be adjusted accordingly to obtain the desired slope of the waste discharge pipe 14 to discharge any waste as required.

Obviously many modifications and variations of the present invention are possible in light of the above teachings. It is, therefore, to be understood that within the scope of the appended claims the invention may be practiced otherwise than as specifically described.

What is claimed is:

1. A new and improved waste pipe support stand system for supporting an external waste pipe on trailer homes, such as travel or portable trailers, comprising, a plurality of spaced waste pipe support stand assemblies, with each assembly consisting of an upright telescoping shaft, a supporting block independently attachable to the ground and formed to receive the lower end of said shaft, and a tiltable trough mounted for selective adjustment onto the top of said shaft to receive a waste pipe to be supported at a selected angle relative to said shaft, each said trough being formed for receiving the pipe for unencumbered longitudinal movement therein, means for connecting said troughs of said assemblies together including a plurality of slots formed in each trough and extension bars extendable between preassembled troughs and having end portions insertable into selected ones of said slots to accommodate spacing of different distances between different pairs of troughs.

2. A new and improved waste pipe stand system as recited in claim 1, and means for adjusting each telescoping shaft vertically to position its respective trough at selected positions vertically spaced from its supporting block.

3. A new and improved waste pipe support stand system as recited in claim 1, a resilient securing means attachable to at least one of said troughs and about the pipe to preclude lateral movement of the pipe from the trough but permit longitudinal movement therein.

* * * * *